UNITED STATES PATENT OFFICE.

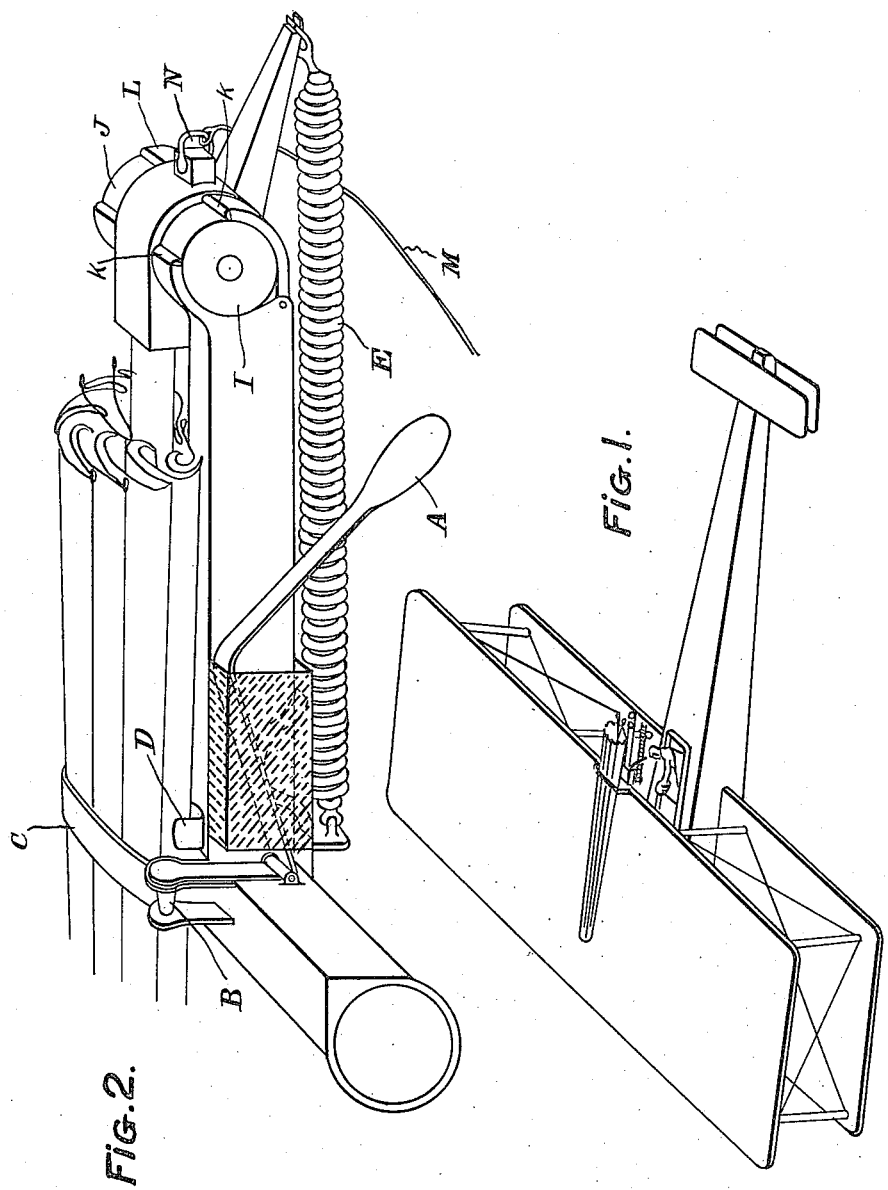

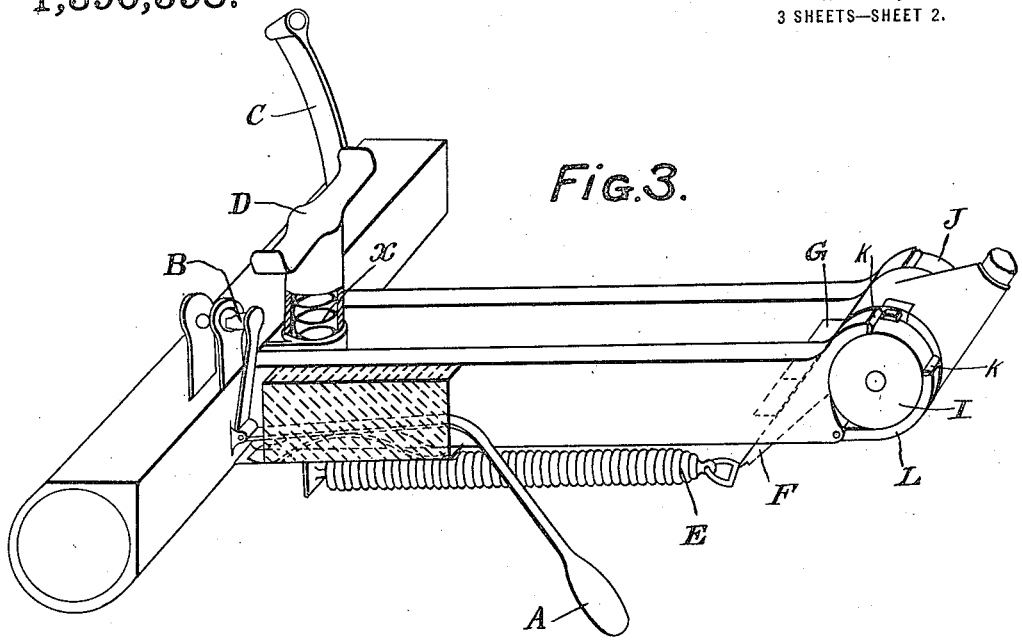
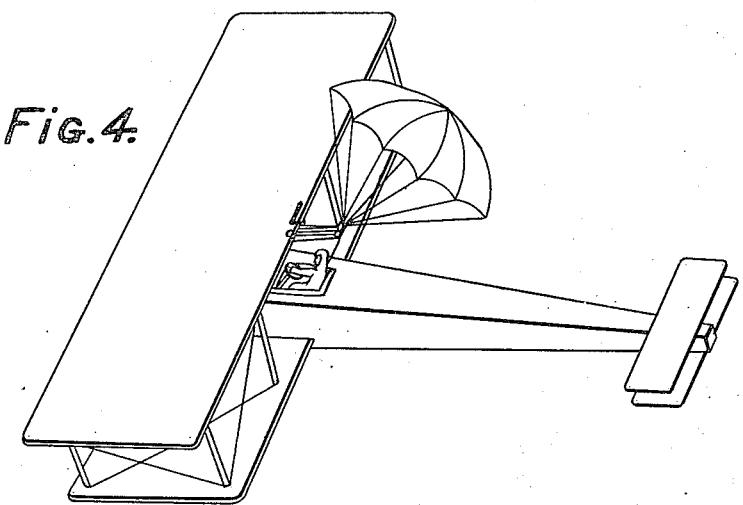

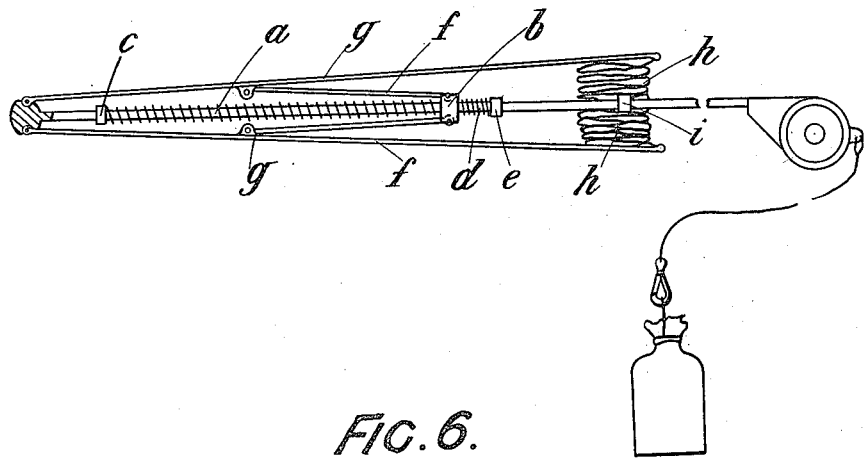
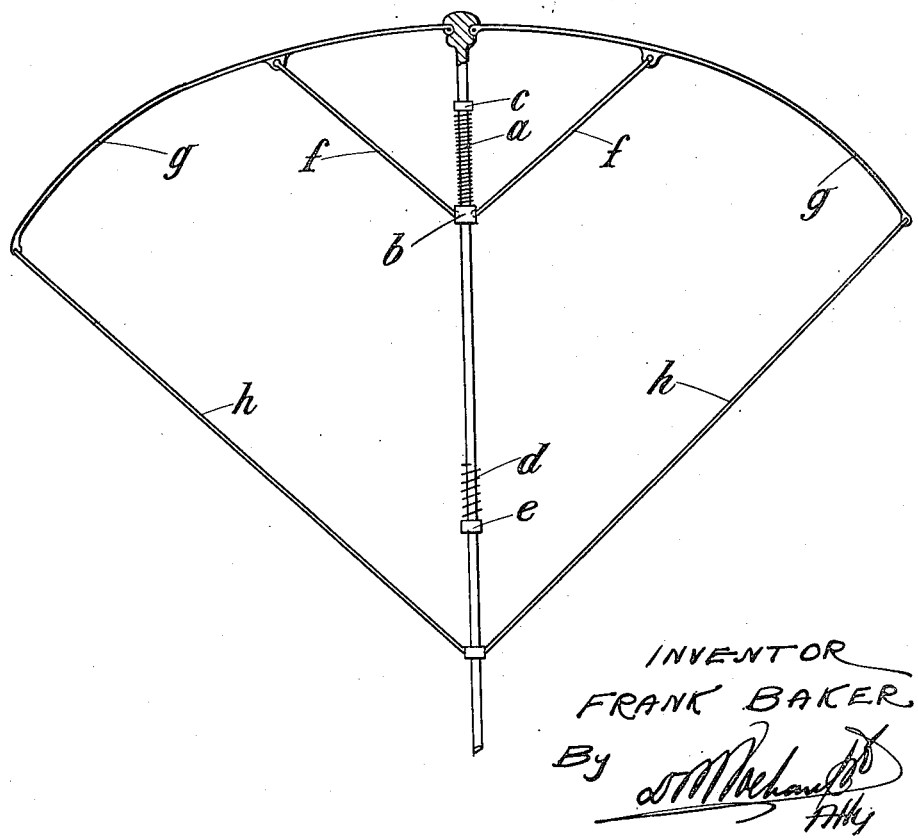

FRANK BAKER, OF PIMLICO, LONDON, ENGLAND.

PARACHUTE.

1,390,598.  Specification of Letters Patent.  Patented Sept. 13, 1921.

Application filed October 6, 1919. Serial No. 328,881.

*To all whom it may concern:*

Be it known that I, FRANK BAKER, a subject of the King of Great Britain and Ireland, and a resident of Pimlico, county of London, England, have invented a certain new and useful Improvement in Parachutes, for which I have obtained a patent in Great Britain, No. 124,677, dated 9th October, 1918, of which the following is a specification.

This invention relates to parachute devices for use with aeroplanes and/or other flying machines both lighter and heavier than air, on or in which the parachute is normally held folded, but when released is forced upward by springs and becomes opened out.

The parachute is so constructed that on being released and so soon as the pressure of air in the parachute hood becomes sufficiently great to bear a man's weight, it pulls the aviator into space and clear of the machine to which it was in the first instance attached.

The distance which the machine would travel from the time of release of the parachute until the latter together with the weight of the aviator were pulled quite clear of the machine would be very small, thus giving the aviator time and opportunity to glide to within two hundred feet of the ground before having to think of his own safety, or in actual warfare he would be in a position to ram an enemy machine with a certainty that this parachute would carry him clear of both falling machines; further, in warfare, the aviator, owing to the fact that the parachute can be released from any position, could devote himself to aggression or self-defense until pulled clear of his machine, and in any case could give the whole of his attention to his machine in the event of mishap until within a very short distance of the ground.

The parachute has also an arrangement for carrying and releasing weights, such as mail bags, by which arrangement the weights are attached to the parachute and on release of the latter are pulled into space in the same manner as previously referred to in connection with the aviator.

According to this invention, the parachute device comprises a masted parachute on a two-wheeled pivot, two arms to hold the parachute when moving to an angle of 45 degrees, a securing band for holding the parachute in any suitable position and parallel to the top of the machine, a lever for disengaging the securing band, an upstart spring for starting the upward movement of the free end of the parachute, a lever attached to the other end of the parachute and connected with a spring under the arms for continuing the movement of the parachute to an angle of 45 degrees, a slot spring to insure the parachute keeping the position at 45 degrees, a spring device to assist the pressure of air to open the parachute more quickly and certainly, a system of cords attached to the ends of the ribs of the parachute and to a fixed collar on the mast to prevent the curvature of the hood becoming too flat when the weight is being sustained, two spring clutches with rollers engaging wheels of pivot mast to allow the open parachute to release itself, a swivel loop attached to the parachute and connected with a wire cable or other suitable cord and also connected to the aviator by a canvas suit or belt, or to the weights to be carried, so as to pull him or them from the machine by the released parachute.

The spring device for expediting the opening of the parachute consists of two helical springs threaded on the mast, one on each side of a sleeve sliding on the mast, to which sleeve the inner ends of a number of spokes are attached, the outer ends being hinged to the ribs of the parachute in a similar manner to the spokes of an umbrella. The spring which is between the sleeve and the apex of the parachute is attached to the sleeve and to a fixed collar on the mast near the apex, and is normally in tension, while the second spring which is below the sleeve is normally in compression between the sleeve and a second fixed collar lower down the mast.

For mail bags, packages and other weights, a cable is fixed by a loop to the end of the mast, and has at its other end a swivel spring hook, into which is placed the fastening around the mail bag or other weight.

The parachute is shown in the accompanying drawings on the top plane of the machine, but it may be placed on the top of the fuselage or in any other suitable position.

Referring to the drawings:—

Figure 1 shows the parachute over the airman's head, but in the case of a loopedtop aeroplane for airman's look-out, the parachute could be placed right or left of the airman.

Fig. 2 shows a view of the parachute lever and mechanism, also part of a parachute in the folded position.

Fig. 3 shows the mechanism tripped and part of the mast at an angle of 45 degrees.

Fig. 4 shows the parachute thrown back and about to release itself and pull the aviator from his machine.

Fig. 5 represents the parachute in the folded position, and shows the spokes, the springs threaded on the mast, the system of cords, and the mail-bag attachment.

Fig. 6 shows the parachute in the distended position.

In the figures, the parts relating to the mechanism for releasing the parachute are referred to by capital letters, and those relating to the mail-bag arrangement, the cords and spring device within the parachute, by small letters.

The operation of tripping the mechanism is as follows:—The aviator pulls the lever handle A which withdraws part B, whereupon the securing band C is thrown back by spring pressed plunger D, drawing the parachute in an upward direction. The parachute is opened out by the tension spring $a$ pulling, and the compression spring $d$ pushing the sliding sleeve $b$ up the mast, thereby spreading out the spokes $f$ the ribs $g$ and assisted by the pressure of air inside the hood, expanding the latter until checked at the required distension, by the cord $h$ and by the spring $a$ which is now in compression against the upper fixed collar $c$, the spring $d$ remaining fixed to the collar $e$. The parachute continues to fall back by the action of the long spring E until the base parachute lever F is resisted by a block or stop G in between the lever arms. The long spring E then falls off lever F.

The wheels I and J run out from the clutches on rollers K as soon as the pressure from the parachute is strong enough to pull clutches L open, the airman being attached by wire cable M which is also attached to loop N—Fig. 2—in head of parachute lever, and being clothed in a canvas suit shaped like a half-bathing suit O—Fig. 4.

Wheels I and J can both be drawn from clutches L either together or separately, thus allowing parachute to be pulled out by any side wind.

The cords are shown in Figs. 5 and 6 fastened to the ends of the ribs $g$ and to a fixed collar at $i$. The mail-bag attachment is shown at $k$—Fig. 5.

I claim:—

1. A releasable parachute mounting for aeroplanes and the like including in combination with the upper wing of the plane, a bracket carried by the latter and consisting of arms having spring clutch elements at the ends thereof, a parachute including a mast having rollers at one end adapted to be releasably held by the said clutch elements, a device for restraining the parachute in position and also releasing the same, said device consisting of a holding band pivoted at one side of the parachute and adapted to be disposed transversely thereof, a manually operated lever for releasing the free end of said band, a plunger placed under compression when the parachute is held beneath the said strap, an arm carried by the mast of the parachute, a tension spring engaging the arm and tending to lift the parachute, and a flexible load connector also carried by the parachute mast.

2. A releasable parachute mounting for aeroplanes and the like including in combination with the upper wing of the plane, a bracket projecting from the said wing, releasable clutch elements carried by the end of the bracket, manually controlled means for maintaining the parachute parallel to the bracket, means carried by the parachute for releasably engaging with the clutch elements of the bracket, and a spring engaging the end of the parachute for elevating the same to operative position whereupon it may be automatically released from the said clutch elements.

3. A releasable parachute mounting for aeroplanes and the like including in combination with the upper wing of the plane, a bracket, resilient clutch elements carried by the ends of the bracket, a parachute mast, rollers carried by the mast and adapted to be engaged by said clutch elements whereby the mast of the parachute may swing on the axis of the rollers as a pivot, a manually controlled restraining and releasing device for the body of the parachute, an arm carried by the end of the mast of the parachute and projecting radially from the axis of the rollers in a direction substantially opposite to the mast, a spring having one end fastened to the bracket and the other end fastened to said arm, and a flexible load connector carried by the mast.

In testimony whereof I have affixed my signature this 1st day of September, 1919.

FRANK BAKER.